Aug. 8, 1944.   F. A. FIRESTONE   2,355,287
SINGING AND SPEAKING MACHINE
Filed Aug. 1, 1940   2 Sheets-Sheet 1

Inventor
Floyd A. Firestone.

Aug. 8, 1944.　　　F. A. FIRESTONE　　　2,355,287
SINGING AND SPEAKING MACHINE
Filed Aug. 1, 1940　　　2 Sheets-Sheet 2
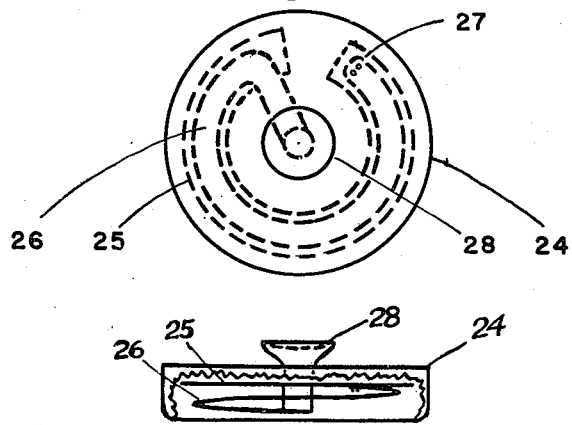
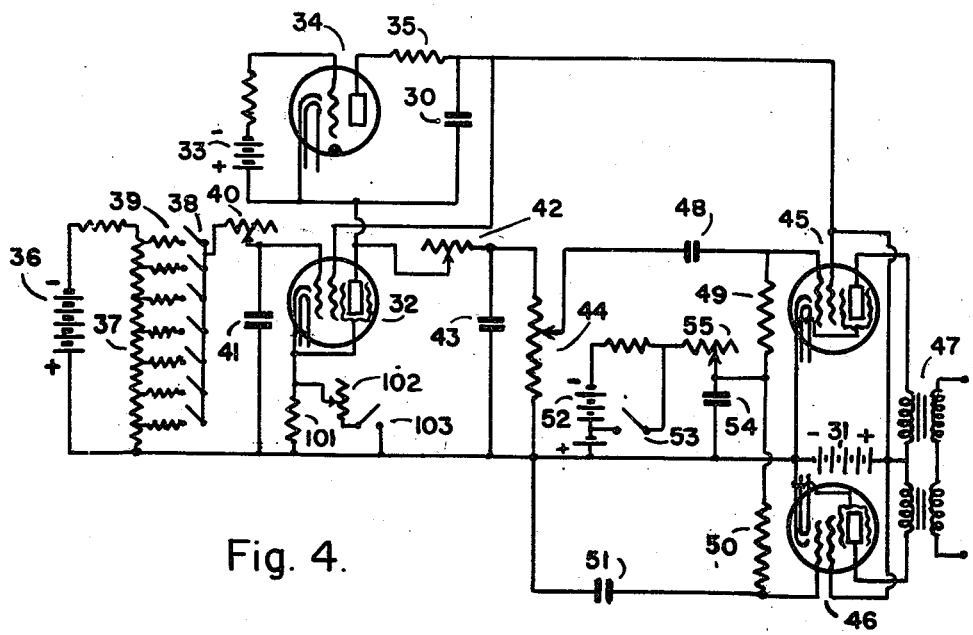
Inventor
Floyd A. Firestone Patented Aug. 8, 1944

2,355,287

UNITED STATES PATENT OFFICE 2,355,287

SINGING AND SPEAKING MACHINE

Floyd A. Firestone, Ann Arbor, Mich.

Application August 1, 1940, Serial No. 349,321

6 Claims. (Cl. 179—1)

My invention relates to a device permitting one person to sing with a number of voices simultaneously, as a quartet or trio, or to speak with one or more voices simultaneously, without the use of his vocal cords.

The object of my invention is to provide a device wherewith, by the exercise of a minimum of skill, one person may sing several part music, as a quartet or trio (which we may call "choral singing").

A further object is to provide a device wherein choral singing by one person may be produced by tones whose pitch is controlled by a mechanical instrument, preferably responsive to a keyboard, so that the singing is done with pitches which are as accurate as can be produced by an instrument.

A further object of my invention is to provide an instrument which will enable a person to sing a beautiful solo even though his own voice be raucous or untrained, or his sense of pitch be unconventional, and which furthermore permits a man to sing soprano or a woman to sing bass.

A further object of one modification of my invention is to provide pitch control means actuated by a keyboard, which nevertheless permits the gliding in pitch from one note to another, which is a characteristic of solo singing.

A further object is to provide an automatic frequency glide from one note to another, but still with the steady state pitch controlled by a keyboard, so that natural gliding singing may be obtained with the steady pitches still controlled by the instrument and not relying on the musical ear of the performer.

A further object is to provide an automatic rate of growth and decay upon starting and stopping the sung tones.

A further object is to provide a vibrato in the singing voice, as produced by the instruments mentioned above, which vibrato is produced by mechanical means, thereby avoiding the long hours of practice which are necessary for the development of a suitable vibrato in the natural voice.

A further object is to provide apparatus by means of which a person may speak without the use of his vocal cords, and with a normal inflection, accent, and distinction between the voiced and unvoiced consonants; furthermore, said speech may consist of a multiplicity of voices all saying the same words, and all controlled by the one person.

Other objects will appear in the description which follows.

Referring to the drawings:

Fig. 3 is a rapidly operable volume control for use as element 22 in the relaxation oscillator of Fig. 2.

Fig. 4 is a refined relaxation oscillator capable of producing an automatic pitch glide and automatic control of attack, for use as a source in singing.

Speaking and singing are very much the same kind of phenomenon except that in singing, the vowels are prolonged and especial attention is given to the pitch upon which the vowels are intoned; beautiful singing also requires the use of a vibrato, a simultaneous periodic fluctuation of pitch and loudness. Consequently, most of the remarks set forth below concerning speech apply equally well to singing.

The fundamental principle of my invention may be explained as follows:

It is well known that the vowel sounds are produced by the complex tone generated by the modulation of the air-stream by the vocal cords, this complex tone being modified by the resonances of the mouth, throat, and nose. The vocal cords may always produce about the same quality of complex tone, and about the only significant change in the tone which can be brought about by the vocal cords, is a change in pitch. However, by changing the size of the opening of the mouth, or the position of the tongue, the resonant frequency of the mouth can be changed, in fact, it may be made to resonate importantly at two or even three frequencies, and it is the frequencies of these resonances which are apprehended by the ear of a listener and give the distinguishing character to the vowels. If a complex tone is introduced into the open mouth through a glass tube, this sound in escaping from the mouth will be subject to the same resonances as would a sound coming from the vocal cords with the mouth held at that same shape, and the vowel corresponding to that shape will be produced. When a person whispers, he shapes his mouth to resonate successively to the various vowels in the speech which he wishes to produce, and in addition he produces the unvoiced consonants f, s, th, sh, p, t, ch, and k through the action of the breath against the tongue, lips, teeth, and other surfaces of the mouth. If, therefore, as in my invention, a complex tone is introduced into a person's mouth while he is whispering, voiced speech or singing will be produced. If the complex tone introduced into the mouth is of good quality, carefully controlled frequency, and possesses a good vibrato, beautiful singing can be produced merely by whispering the words of the song, the person's own vocal cords being inactive. Furthermore, if several complex tones of different pitch are simultaneously introduced into the mouth, each tone will be simultaneously subject to the same resonance frequencies, namely, those frequencies for which the mouth is shaped to resonate, the same vowels will be produced by each of the tones, and choral singing or speaking will be produced merely by whispering. This is the essential principle of my invention.

Figure 1:
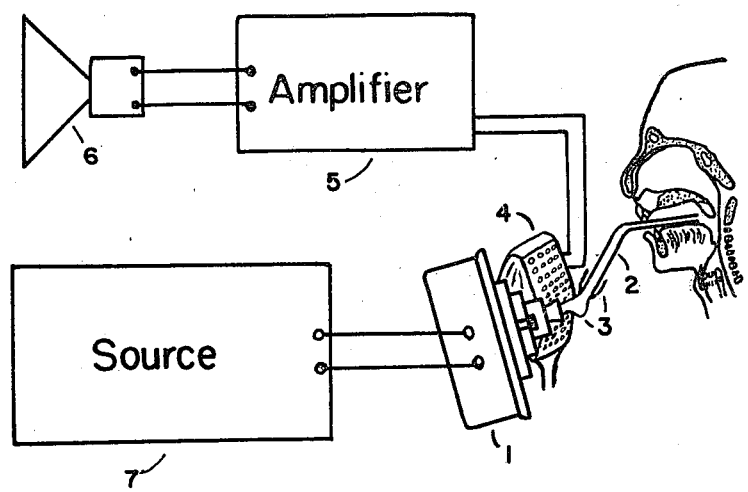
Fig. 1 is a block diagram of the general layout of my invention.

The basic arrangement of equipment for carrying out my invention is shown in the block diagram, Fig. 1. Here 1 is a loud speaking receiver of conventional design and preferably of considerable power handling capacity. It is not necessary to illustrate this receiver in detail as many suitable types can be purchased commercially; the type which I have used is the Western Electric 555, consisting of a diaphragm with attached coil through which the audio frequency currents flow, said coil being situated in a steady magnetic field. Such loud speaking receivers are usually attached to the small end of a horn to form a loud speaker; here, however, the receiver 1 is in airtight connection with one end of a tube 2 (preferably glass) whose other end is placed in the mouth. This tube is provided with saliva traps 3, both inside and outside. Near the mouth is placed a microphone 4 which is connected to an amplifier 5 and loudspeaker 6 which form a public address system which should be designed to serve the size of audience at hand; for use in a small room, the public address system may be omitted. The source 7 may consist of any one of a variety of devices capable of producing audio-frequency currents, for instance, an electric phonograph, electric organ, Hammond organ, Hammond Novachord, Everett organ, Theremin, electric violin, electric guitar, relaxation oscillator, or the oscillators of Figs. 2 and 4. It is to be understood that in each of the sources mentioned above, which normally reproduces through a loud-speaker, said loudspeaker is to be disconnected and the electrical output of the source is to be connected to the loud speaking receiver 1.

Assuming for the moment that the source is an electric organ, the functioning of the equipment of Fig. 1 is as follows: With the organ set to produce some musically pleasing complex tone quality, preferably containing a full series of harmonics, if one key is depressed, the audio-frequency current will actuate the loud-speaking receiver 1 which will introduce a complex tone into the mouth of the performer, the frequency, quality, and vibrato of this tone being determined by the organ, not demanding any skill from the performer, in those respects. If as the key is depressed, the performer whispers the syllable of the song which is to be sung on that note, the mouth will quite naturally be set to resonate at the frequencies necessary to produce the vowel of the syllable, and the breath will produce the fricative consonants in the usual manner. The forthcoming sound from the mouth, may then be amplified by the public address system as shown. If several keys are simultaneously depressed, forming a chord, then these several complex tones will pass through the mouth and will all be subject to the resonance of the mouth so that the same vowel will be produced in all pitches simultaneously. Thus several part harmony may be sung by one person, the limiting condition being that the same words must be sung in all the parts.

A really artistic performance can be produced with this equipment, and the words can be understood better than from the usual singer. However, in order to obtain artistic results it is necessary to develop skill and a proper technique through practice. The beginner may forget to whisper, may get the sound shut off entirely by permitting the tongue to cover the end of the tube, may produce most distressing gargling sounds through permitting the end of the tube to become immersed or covered with saliva, or may fail to distinguish between the voiced and unvoiced sounds. A fairly large diameter of tube is more satisfactory than a small diameter since the end of a large diameter tube is less apt to become covered by the tongue or by saliva; furthermore, a larger diameter transmits more sound into the mouth permitting the public address system to be eliminated when singing for small groups. An outside diameter of 0.9 cm. is quite satisfactory. The tube should preferably enter the side of the mouth opening so as to permit the center of the lips freedom of movement in the normal manner, also to permit the tip of the tongue to move up and down and to contact the roof of the mouth normally. The tube preferably enters one corner of the mouth opening, passes between the teeth and ends on top of the tongue, but at the side of the top of the tongue, just about adjacent to a wisdom tooth. It is important that the tube extend back into the mouth to about the wisdom tooth so that when the back of the tongue rises in making the nasal sound "ng" as in "lung," the tube will hold down one corner of the base of the tongue and continue to pass sound back into the throat and out through the nose. This arrangement, however, still permits most of the base of the tongue, freedom to rise and fall as it normally does in producing the vowels. A tube, straight within the mouth, is about as comfortable as any curved tube, although this may depend somewhat on the exact anatomy of the individual mouth. By keeping the opening of the tube well back on the tongue, there is less probability of covering the end of the tube with the tongue when the base of the tongue rises. In order to distinguish between the unvoiced sounds f, s, th, sh, p, t, ch, k, and the corresponding voiced sounds v, z, th, zh, b, d, j, g, it is necessary to quickly release the keys for a short interval while the unvoiced consonant sound is being whispered. In singing, the keys are depressed most of the time and one plays on the keyboard with a legato style, but looks ahead at the words which are being whispered and whenever an unvoiced sound is arrived at, the keys are released for a short interval while the unvoiced sound is whispered.

These matters of tube size and position, and technique of use, are important and make the difference between the production of gargling mouthy sounds which are a pain to listen to, and the production of artistic sounds of rare beauty. Anyone setting up similar equipment but failing to develop the proper proportions and position of tube, and failing to develop proper technique of use, would conclude that the experiment was a failure, and would abandon the invention. With the refinements noted above, my invention is not a mere interesting toy, but is a serious musical instrument which, with about 20 hours of practice, enables a performer of but moderate musical attainments to produce vocal music of unusual beauty.

If the source 7 is an electric phonograph playing instrumental music, by whispering the words of the song, the music is changed into a vocal rendition of the same selection; if the record reproduces a chorus of instruments, the result will sound like choral singing. The Theremin is a solo instrument whose pitch and intensity are controlled by the motion of the hands in space; if a Theremin is used as source 7, a very good solo can be sung, with the especial advantage that the pitch is continuously variable, as is customary in singing. Furthermore, since the pitch is continuously variable, very good speech can be produced merely by controlling the pitch in accordance with the usual inflection of the speaking voice, while whispering the words. An electric violin whose vibration is picked up and amplified, may be used as source 7 in much the same manner as the Theremin. An electric guitar produces an unusual attack and tone quality, which nonetheless can be used for singing.

Figure 2:
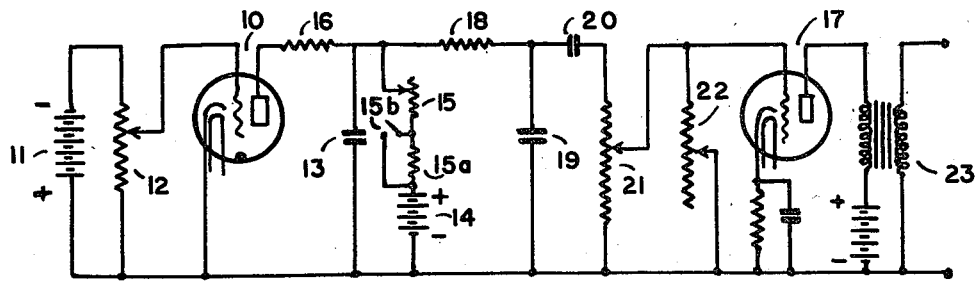
Fig. 2 is a simple relaxation oscillator suitable for use as a source in speaking or singing.

For solo singing or for speaking, the simple relaxation oscillator shown in Fig. 2 may be employed in the role of source 7 of Fig. 1. In Fig. 2 a gas filled triode 10 (such as RCA type 884) has its grid held at a fixed negative bias by the battery 11 acting through the potentiometer 12. Condenser 13 is charged by battery 14 at a rate determined by the magnitude of variable resistor 15. The plate circuit of triode 10 is shunted across condenser 13 and when the potential across condenser 13 reaches a certain critical value, triode 10 suddenly becomes conducting and discharges the condenser at a rate determined principally by the discharge current limiting resistor 16. As soon as the condenser is discharged, the triode ceases to be conducting and the condenser again starts to charge. This process is therefore repeated cyclically with a fundamental frequency which is determined principally by the momentary magnitude of the variable resistor 15. The voltage across condenser 13 is therefore of saw-tooth form and this voltage is fed to the amplifying triode 17 through, a low pass filter consisting of high resistor 18 and condenser 19, (additional stages of such filtering might be used), and through grid condenser 20 and volume control potentiometers 21 and resistor 22. Transformer 23 carries the amplified output of the relaxation oscillator to the loud-speaking receiver 1 of Fig. 1. While potentiometer 21 is of conventional volume control type, resistor 22 is of special construction as shown in Fig. 3. This consists of a case 24 holding a flat carbonized resistance element 25 cut out in approximately circular form as shown. This strip is normally covered by a flat strip of springy metal 26 of shape as shown, which is fastened at end 27 and normally springs up against the resistance strip so as to short the resistor. However, upon gradually depressing the knob 28 the metal strip is caused to gradually unroll from the resistance strip 25 thereby gradually increasing the resistance. Since this resistor is connected across the line as resistor 22 in Fig. 2, it serves as a fast acting volume control wherein the entire volume range is secured by the motion of the finger tip through only about 6 millimeters; this resistor may also be considered as a switch which serves to connect the relaxation oscillator to the loud-speaking receiver 1 without the production of a starting click. A frequency vibrato may be produced by a motor driven contactor 15b which periodically shorts a small resistor 15a.

The relaxation oscillator of Fig. 2 is an excellent source 7 for use in speaking or singing since the saw-tooth wave as modified by the filter 18, 19 gives a quality which is a good approximation to the voice and the pitch may be conveniently and continuously controlled merely by varying the resistor 15. For speaking it is quite satisfactory to have the resistor 15b in the form of a continuously variable rotating knob control and the inflection and emphasis can be given to the words by proper rotation of the knob. For singing, the resistor 15 may be varied by the contacts under an organ keyboard in an obvious manner. The push-button volume control 22 (and Fig. 3) is used for distinguishing between the voiced and unvoiced sounds, and for rapid changes of volume. Thus since both pitch, loudness, and voicing are subject to instantaneous control, very good speech or solo singing can be produced without the use of the vocal cords. In a person who has normal vocal cords, these may be used for the simultaneous singing of another part of the harmony in addition to the one being generated by the oscillator; the same words will appear in both parts.

A more refined relaxation oscillator for use in singing is shown in Fig. 4. With this oscillator, the pitch is determined by depressing a key on a keyboard thereby removing the necessity for skill on the part of the performer in recognizing and adjusting the pitch; nevertheless, in passing from one note to another, the pitch does not change discreetly but with a rapid glide, the rate of this glide being controllable. By simultaneously depressing two or more keys, pitches intermediate between the keys can be obtained. Upon starting a new tone, the sound does not begin abruptly but with a gradual attack whose rate of growth is controllable. Thus very natural legato singing with gradual attack and perfect pitch can be produced, with a minimum requirement of skill on the part of the performer. Condenser 30 is charged at approximately constant rate by current from battery 31 passing through the plate circuit of the remote cut-off pentode 32 (such as RCA type 6U6). When the voltage across condenser 30 reaches a certain critical value determined by the size of the bias battery 33, the gas triode 34 (such as RCA, type 884) suddenly becomes conducting and quickly discharges condenser 30 through the current limiting resistor 35. This process is repeated cyclically and thereby generates an audio-frequency saw-tooth wave which is fed to the amplifying system shown at the right. The frequency of the wave is controlled by varying the bias on the control grid of the pentode 32 which thereby determines the rate at which the tube passes charging current to condenser 30. This grid bias is obtained from battery 36 and voltage divider 37, the appropriate voltage being selected through closing one of the switches 38 each of which is on a separate key of the keyboard. The taps on the voltage divider are chosen experimentally to give the desired frequencies. The series resistors 39, each roughly equal in resistance to the resistance of the voltage divider itself, permit two keys to be closed (depressed) simultaneously, thereby obtaining an intermediate frequency. The voltages controlled by the key contacts 38 are not impressed on the pentode grid immediately but through the series resistor

40 and shunt condenser 41; by varying resistor 40, the time constant of this resistor-condenser combination may be made suitable for producing an artistic glide or portamento, due to the time delay in changing the charge of condenser 41. Thus while the pitch is determined primarily by the key which is depressed, it is still possible to glide from note to note, an essential characteristic of vocal music. If a different form of frequency variation is desired on passing between notes, a more complicated network may be substituted for resistor 40 and condenser 41. Some bias is obtained on tube 32 by the cathode resistor 101; this is shunted by a larger resistor 102 in series with a motor driven contactor 103 which produces a frequency vibrato through periodic variation of the plate current of the pentode 32.

The audio-frequency voltage fluctuations across condenser 30 are impressed on the amplifier at the right through the filter consisting of series resistor 42 and shunt condenser 43, which may contain additional sections if desired. The audio voltage then passes through volume control potentiometer 44, preferably operated by the foot, after which it might be taken through a push button volume control as 22 in Fig. 2, and thence to an amplifier as shown at the right of Fig. 2. A better amplifying arrangement, however, is that shown at the right of Fig. 4 consisting of the two remote cut-off power amplifying tubes 45 and 46 whose plate circuits are supplied by the battery 31 through the two equal primaries of the output transformer 27 whose secondary is connected to the loud-speaking receiver 1 of Fig. 1. The transformer is connected bucking in such a manner that when the grids of both tubes 45 and 46 are growing more negative at an equal rate, no voltage is delivered to the output. Tube 45 receives the audio voltage through grid condenser 48 and across grid leak 49 while tube 46 has an equal grid leak 50 and grid condenser 51 which, however, is connected to ground and does not receive any audio signal. When no note is being sung, both of these tubes are biased beyond cutoff by the battery 52 and no output is obtained, but upon depressing any key full down, the switch 53 is closed (as explained below) and connects the grids of both tubes to a less negative tap on battery 52, the voltage change on these grids being brought about gradually by the necessity of shunt condenser 54 being charged through a resistor 55 which may be adjusted to give the desired time constant in the attack. Grid condenser 48 (and its equal mate 51) must be large enough to pass the audio frequency to the grid of the tube without serious loss, but not large enough to seriously delay the grid voltage changes which come about through the closure of switch 53. Any thump or click which might arise through the changes in average grid bias of tube 45 are balanced out by the bucking tube 46 which receives the same changes of bias; obviously these should be matched tubes.

In the preferred arrangement each key has three positions; up, half down, and full down. In the up position no contact is closed. In the half down position and on into the full down position, a pair of contacts corresponding to one of the switches 38, are closed. In the full down position only, a pair of contacts corresponding to switch 53, are closed; these lower contact pairs on all the keys are connected to close only the single switch 53. Upon depressing a key to the half down position, the oscillator glides from the frequency last used, to the frequency corresponding to the key depressed, and if the performer desires this glide to appear at the beginning of the tone as sung, he quickly depresses the key to the full down position thereby causing the amplifier to start the tone at a rate of attack determined by the resistor 55 and condenser 54. If it is desired to glide to another note, the second key is depressed to the full down position just as the first key leaves the full down position to be released to the up position. If, on the other hand, an unvoiced consonant is to be uttered between the two tones, the first key may be released before the second key is depressed to the full down position, thereby leaving an interval in which the consonant may be widespread. If the glide to the second tone is not desired, the second key may be held in the half down position during this interval, or the resistor 40 may be cut to zero, preferably by a foot control. If it is desired to momentarily flat a tone which is being held, this can be accomplished by momentarily tapping a lower key than the one held, having resistor 40 set to give the desired delay. By alternately depressing two adjacent keys, a neat trill involving all intermediate frequencies, can be produced.

To summarize, pitch and voicing are controlled by keys 38 and contacts 53; rate of glide is controlled by resistor 40; rate and amount of vibrato are controlled by switch 103 and resistor 102; quality is controlled by resistor 42, or by switching in additional filter sections; rate of attack is controlled by resistor 55, preferably foot operated. Thus maximum flexibility and variety of vocal effects are provided for in such a manner that a minimum of skill and inherent musical talent are required.

Many equivalent constructions and variations of my invention will be evident to those skilled in the art and may be employed without departing from the spirit of my invention.

The following definitions of terms used in the claims, are to be understood:

*Electro-acoustic transducer.*—A device actuated by audio-frequency alternating current and producing an alternating volume velocity of sound.

*Linear electro-acoustic transducer.*—A device actuated by audio-frequency alternating current and producing an alternating volume velocity of sound, the frequencies of the tones produced being the same as the frequencies in the actuating alternating current and the magnitudes of the volume velocities of the tones produced being approximately proportional to the magnitudes of the corresponding component frequencies in the actuating alternating current.

*Electrical musical instrument.*—A source of alternating current whose frequency or frequencies are selectively controllable by a performer, and of such character that if this current were connected to a loud-speaker, musical sounds would be produced; examples, electric organ, Theremin, electric violin, electric guitar, variable frequency vacuum tube oscillator, variable frequency relaxation oscillator.

*Relaxation oscillator.*—An oscillator in which a condenser, charged from a constant potential source, is comparatively suddenly discharged by the action of a device shunted across it which becomes conducting when a critical potential is reached. Examples, the oscillators of Figs. 2 and 4.

*Critical breakdown device.*—A device which passes very little current until the voltage reaches a certain critical value at which the device becomes quite conducting, the nonconducting state being restored when the voltage or current falls below a certain value; examples, gas filled triode or neon glow tube.

*Pitch glide.*—A gradual change in pitch upon passing from the pitch of one tone to the pitch of another, as distinguished from a discreet pitch change as is customary on keyboard instruments. When a pitch glide is secured by "automatic" means, the glide is produced by the inherent action of that means, the time delay in the pitch change being determined by the structure and adjustment of the means, as distinguished from manually operated means.

What I claim is:

1. A source of audio frequency electrical currents for a singing or speaking machine, comprising an electrical oscillator, key operated means for controlling the pitch of said oscillator, and automatic means for securing a pitch glide.

2. A source of audio-frequency electrical currents for a singing or speaking machine, comprising a relaxation oscillator comprising key operated pitch control means, and automatic means for securing a pitch glide.

3. A source of audio-frequency electrical currents for a singing or speaking machine, comprising a relaxation oscillator comprising key operated pitch control means, and means for the automatic control of the magnitude of the output current of said oscillator.

4. A source of audio-frequency electrical currents for a singing or speaking machine, comprising an oscillator, key operated means for the control of the pitch of said oscillator, means for the automatic control of the magnitude of the output current of said oscillator, said automatic control means being responsive to contacts on the same keys which operate the pitch control means.

5. A source of audio-frequency electrical currents for a singing or speaking machine, comprising a relaxation oscillator consisting of a condenser shunted by a critical breakdown device, means for charging said condenser including an electron tube having a control grid, key operated means for controlling the steady state potential of said control grid, and a circuit for causing the grid potential changes occasioned by said key-operated means to be brought about gradually.

6. A source of audio-frequency electrical currents for a singing or speaking machine, comprising a relaxation oscillator consisting of a condenser shunted by a critical breakdown device, means for charging said condenser including an electron tube having a control grid, key operated means for controlling the steady state potential of said control grid, a circuit for causing the grid potential occasioned by said key-operated means to be brought about gradually, an amplifier actuated by said oscillator and containing an electron tube whose amplification factor depends on the average potential of a grid, means operated by contacts on said pitch control keys for controlling the steady state average potential of said amplifier grid, and a circuit for causing the amplifier grid potential changes occasioned by said last mentioned means to be brought about gradually.

FLOYD A. FIRESTONE.